US010002127B2

United States Patent
Beckwith et al.

(10) Patent No.: US 10,002,127 B2
(45) Date of Patent: Jun. 19, 2018

(54) CONNECTING PEOPLE BASED ON CONTENT AND RELATIONAL DISTANCE

(71) Applicants: Richard T. Beckwith, Hillsboro, OR (US); Kenneth T. Anderson, Portland, OR (US); Maria Bezaitis, Portland, OR (US); Rita H. Wouhaybi, Portland, OR (US)

(72) Inventors: Richard T. Beckwith, Hillsboro, OR (US); Kenneth T. Anderson, Portland, OR (US); Maria Bezaitis, Portland, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 14/308,124

(22) Filed: Jun. 18, 2014

(65) Prior Publication Data
US 2015/0205785 A1    Jul. 23, 2015

Related U.S. Application Data

(60) Provisional application No. 61/928,987, filed on Jan. 17, 2014.

(51) Int. Cl.
*G06F 17/30* (2006.01)
*G06F 17/27* (2006.01)
*G06Q 10/00* (2012.01)

(52) U.S. Cl.
CPC ...... *G06F 17/277* (2013.01); *G06F 17/30616* (2013.01); *G06F 17/30705* (2013.01);
(Continued)

(58) Field of Classification Search
CPC .......... G06F 17/2785; G06F 17/30864; G06F 17/30867; G06F 17/277; G06F 17/30616;
(Continued)

(56) References Cited

U.S. PATENT DOCUMENTS

| 7,917,496 B2 * | 3/2011 | King | G06F 17/277 707/713 |
| 8,589,399 B1 * | 11/2013 | Lee | G06F 17/30616 707/737 |

(Continued)

FOREIGN PATENT DOCUMENTS

| CN | 103218400 A | 7/2013 |
| CN | 103399877 A | 11/2013 |

(Continued)

OTHER PUBLICATIONS

Alstyne et al., "Electronic Communities: Global Village or Cyberbalkans?", Mar. 1997, 32 pages.
(Continued)

*Primary Examiner* — Dangelino N Gortayo
(74) *Attorney, Agent, or Firm* — Barnes & Thornburg LLP

(57) ABSTRACT

Technologies for establishing connections between or among people based at least in part on semantic distance and relational distance include one or more computing devices that analyze content created by computing device users, perform content clustering on the content, determine relational distances between connection candidates, and generate connection recommendations based at least in part on the content clustering and the relational distances.

23 Claims, 3 Drawing Sheets

(52) U.S. Cl.
CPC ....... *G06F 17/30864* (2013.01); *G06Q 10/00* (2013.01); *G06F 17/30554* (2013.01); *G06F 17/30684* (2013.01); *G06F 17/30867* (2013.01)

(58) Field of Classification Search
CPC ......... G06F 17/30029; G06F 17/30684; G06F 17/2715; G06F 17/2735
USPC ........ 707/738, 732, 734, 737, 741, 748, 769
See application file for complete search history.

(56) References Cited

U.S. PATENT DOCUMENTS

| | | | | |
|---|---|---|---|---|
| 8,615,524 | B2* | 12/2013 | Kanigsberg | G06F 17/30867 707/765 |
| 8,819,728 | B2* | 8/2014 | Fleischman | H04N 21/23424 725/110 |
| 8,983,974 | B1* | 3/2015 | Jackson | G06F 17/30699 707/748 |
| 9,075,898 | B1* | 7/2015 | Ayzenshtat | G06F 17/3064 |
| 9,195,752 | B2* | 11/2015 | Amer-Yahia | G06F 3/00 |
| 9,280,534 | B2* | 3/2016 | Hauser | G06F 17/273 |
| 9,311,308 | B2* | 4/2016 | Sankarasubramaniam | G06F 17/30828 |
| 2007/0073678 | A1* | 3/2007 | Scott | G06F 17/30737 707/999.005 |
| 2013/0040277 | A1 | 2/2013 | Linton et al. | |
| 2013/0066876 | A1* | 3/2013 | Raskino | G06F 17/30528 707/741 |
| 2013/0166648 | A1 | 6/2013 | Allard et al. | |
| 2013/0226910 | A1* | 8/2013 | Work | G06Q 10/00 707/722 |
| 2013/0275429 | A1* | 10/2013 | York | G06F 17/30029 707/737 |
| 2014/0236943 | A1* | 8/2014 | Li | G06F 17/30699 707/736 |
| 2014/0279998 | A1* | 9/2014 | Blumenfeld | G06F 17/30864 707/706 |
| 2015/0046496 | A1* | 2/2015 | Karmarkar | G09B 7/00 707/798 |
| 2015/0195220 | A1* | 7/2015 | Hawker | H04L 51/02 709/206 |

FOREIGN PATENT DOCUMENTS

| | | |
|---|---|---|
| JP | 2006-215681 A | 8/2006 |
| JP | 2009-541893 A | 11/2009 |
| JP | 2011-513802 A | 4/2011 |
| JP | 2013-254305 A | 12/2013 |

OTHER PUBLICATIONS

Granovetter, "The Strength of Weak Ties", American Journal of Sociology, vol. 78, Issue 6, (May 1973), 22 pages.
Bhattacharyya et al., "InfoSearch: A Social Search Engine", Data Mining and Knowledge Discovery for Big Data Studies in Big Data vol. 1, Nov. 1, 2013, 32 pages.
Ye et al., "Measuring Message Propagation and Social Influence on Twitter.com", Social Informatics Lecture Notes in Computer Science vol. 6430, Oct. 2010, 16 pages.
Office Action and English Translation for Japanese Patent Application No. 2014-253550, dated Jul. 12, 2016, 4 pages.
Office Action and English Translation for Korean Patent Application No. 2014-0181787, dated Jun. 1, 2016, 11 pages.
European Search Report for Application No. 14194775.4-1958, dated Apr. 24, 2015, 8 pages.
Office Action and English Translation for Japanese Patent Application No. 2014-253550, dated Dec. 15, 2015, 6 pages.
Office Action and Search Report for Chinese Patent Application No. 201410788521.8, dated Oct. 30, 2017, 7 pages.
Office Action and English Translation for Korean Patent Application No. 2014-0181787, dated Jun. 30, 2017, 5 pages.
Office Action and English Translation for Korean Patent Application No. 2014-0181787, dated Apr. 24, 2017, 6 pages.
Office Action for European Patent Application No. 14194775.4-1958, dated Mar. 17, 2017, 7 pages.

\* cited by examiner

CONNECTING PEOPLE BASED ON CONTENT AND RELATIONAL DISTANCE

CROSS-REFERENCE TO RELATED APPLICATION

This application claims the benefit of and priority to U.S. Provisional Patent Application Ser. No. 61/928,987 filed Jan. 17, 2014.

BACKGROUND

A social network identifies individuals and the connections or relationships between them, typically from a relational perspective. Mathematical analyses may be used to develop or expand a social network to include links between people who are not otherwise formally connected as friends, family, or colleagues. For example, Internet messaging and social media services may use mathematically-generated operations to automatically recommend new connections to their users. Some existing systems attempt to connect users within a social network if the users have a high affinity for certain content, but only if the users are relationally close. In other words, existing systems are more likely to recommend a connection to a user if the user and the recommended connection are already closely related in the social network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
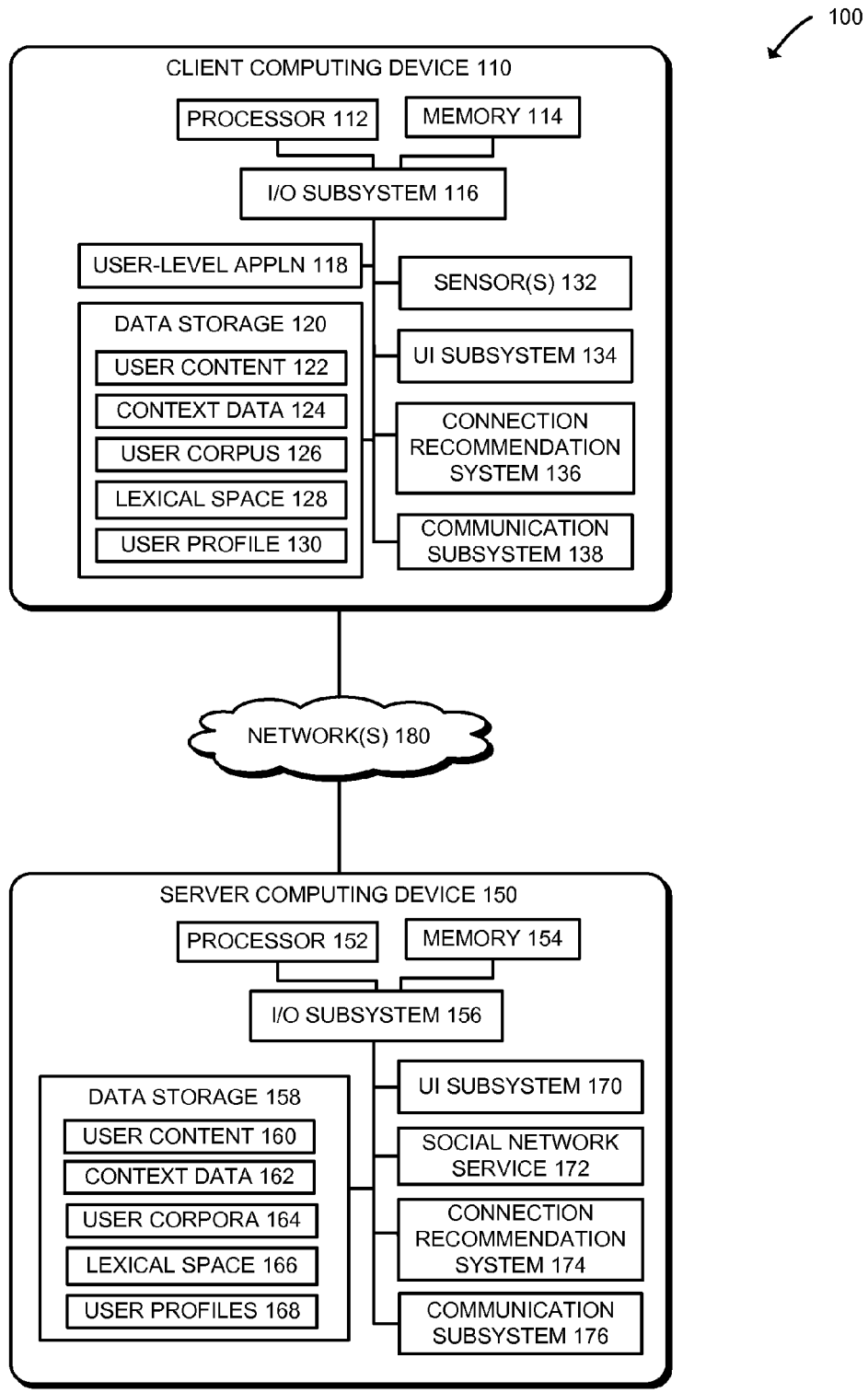
FIG. 1 is a simplified block diagram of at least one embodiment of a computing system including a client computing device, a server computing device, and a connection recommendation system as disclosed herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a computing system 100 includes at least one client computing device 110 and at least one server computing device 150. As described in more detail below, portions of a connection recommendation system 136, 174 are embodied in the client computing device 110 and/or the server computing device 150 as software, firmware, hardware, or a combination thereof. The illustrative connection recommendation system 136, 174 can generate connection recommendations for computing device users based on both a semantic analysis of structured and/or unstructured content created by different computing device users and measures of relational distance between the users creating such content.

As used herein, a "connection" may refer to, among other things, a computerized mechanism that establishes an electronic (e.g., "online" or "virtual") relationship or association between two different people. For example, a connection may identify a user as a "link," "friend," "contact," "addressee," or "follower" of another user, in various different user-level computer applications. As used herein, a "connection recommendation" may refer to, among other things, a computerized mechanism by which a computing device user is made aware of another user. For example, a connection recommendation may be effectuated by way of an electronic message, a suggestion, or a notification that is presented by a computing device in a human-perceptible form (e.g., visual, audio, tactile, etc.). A connection recommendation may identify another user with whom the current user may wish to connect, or may identify a pair of users for whom a connection is suggested by the computing system 100. A connection recommendation may also include an explanation of the reason(s) why the recommendation is being made and/or the criteria that led the computing system 100 to make the recommendation. As used herein, a "semantic analysis" may refer to, among other things, a type of content analysis that considers the user-intended meaning of lexical items (e.g., words, parts of words, or groups of words) that occur in the user-generated content. For example, where a lexical item may be interpreted different ways, a semantic analysis may consider, among other factors, the context in which the lexical item occurs, in order to ascertain the actual, user-intended meaning of a particular instance of the lexical item. In contrast, a "lexical" analysis may refer to, among other things, a type of content analysis that is "context-free" in the sense that the lexical syntax of the content is analyzed without reference to the context. For example, a lexical analysis may analyze the word structure or phrase structure of individual words and phrases without considering any of the surrounding content. References to "content analysis" as used herein may include semantic analysis, lexical analysis, a combination thereof and/or other forms of content analysis. As used herein, "structured" content may refer to, among other things, user input (e.g., alphanumeric text) that has a pre-defined format or meaning. For example, structured content may include text that is entered into an input field or dialog box of a user-level application, such as numerical values, date values, user names, email addresses, and/or others. In contrast, "unstructured" content may refer to, among other things, user input that does not have a pre-defined format or meaning. For example, unstructured content may include natural language alphanumeric text, such as text that may be contained in the body of a document, an email message, a text message, a blog, or a social media post (e.g., a "status update," "tweet," "comment," or "wall post"). Of course, while certain examples described herein refer to "text" content, it should be understood that the disclosed functionality can be applied to other forms of content (e.g., audio, video, etc.), alternatively or in addition to text. As used herein, "relational distance" may refer to, among other things, a measure of distance between two people from a social or relational perspective, where "distance" may be used herein to denote a lack of relational closeness. For example, in a social network, relational distance may be measured by the number of interim connections that are needed to connect two people who are not directly connected in the network. In some embodiments, relational distance may be indicated by the "degree" of a connection, where a higher degree indicates a longer relational distance and a lower degree corresponds to a shorter relational distance.

By considering the lexical or semantic or meaning of user-generated content and the relational distance between individuals that have created similar content, the connection recommendation system 136, 174 can, among other things, generate connection recommendations that are likely to be more unique or intriguing, because they may include people with whom the user does not share a close bond, yet who have a meaningful need, interest or skill in common with the user. As an example, suppose a literary scholar in Europe is studying Melville's *Moby Dick* and posts a blog entry in which she mentions the fishermen on the whaling ship talking about "crackling" Separately, a chef in New England posts a comment on a recipe for "crackling." The word "crackling" has multiple different meanings. For example, crackling may refer to a process for cooking fat until it is crispy, or may be used as a noun (e.g., a synonym for "rind rendered from fat"), or may be used as an adjective (e.g., "the crackling fire" or "that crackling sound"). Nonetheless, embodiments of the connection recommendation system 136, 174 may suggest to the literary scholar in Europe that she establish a connection with the chef in New England (or vice versa), on the basis that both the scholar and the chef seem to be interested in the same type of crackling and are unlikely to already know each other.

The illustrative connection recommendation system 136, 174 is embodied to include a "local" portion 136, which resides on the one or more client computing devices 110 and a "remote" portion 174, which resides on the one or more server computing devices 150. For example, different versions of the local portion 136 may reside on different types of computing devices (e.g., different types of mobile computing devices, such as smart phone and tablet, or different brands or operating systems). Alternatively or in addition, the "remote" portion 174 may be distributed across multiple server computing devices 150, in some embodiments (e.g., "in the cloud"). The local portion 136 and the remote portion 174 may each be embodied as software, firmware, hardware, or a combination thereof. For ease of discussion, references are made herein to each of the client computing device 110 and the server computing device 150 in the singular form; however, such references are intended to encompass embodiments in which multiple client computing devices 110 and/or multiple server computing devices 150 are employed. Further, it should be understood that functionality illustratively described herein as performed by the client computing device 110 may be performed by the server computing device 150 and vice versa, in other embodiments.

The server computing device 150 and the client computing device 110 (and thus the portions 136, 174 of the connection recommendation system 136, 174) are communicatively coupled by one or more wireless, optical, and/or wired communication networks 180. Each of the client computing device 110 and the server computing device 150 may be embodied as any type of electronic device capable of performing the functions described herein. For example, either or both devices 110, 150 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. Additionally, in cases in which a person uses multiple electronic devices (perhaps simultaneously, as in the case of a smartphone, wearable device, tablet computer, and/or laptop), portions of the connection recommendation system 136, 174 can be embodied on each of such devices, such that the system 136, 174 can receive data from any number of electronic devices by which the user is connected to the system 136, 174.

As shown in FIG. 1, the illustrative client computing device 110 includes a processor 112, memory 114, an input/output subsystem 116, a user-level application 118, a data storage device 120, which has embodied therein data that may be used by the connection recommendation system 136, 174 to perform the functions described herein, including: user content 122, context data 124, a user corpus 126, a lexical space 128, and a user profile 130. The user content 122 includes content that is created by the computing device user and at least temporarily stored on the client computing device 110. As such, the user content 122 may include documents of any type, messages, images, audio recordings, and/or other types of user-generated electronic content. The context data 124 includes data that indicates an aspect of the user's current context. For example, the context data 124 may include sensor data or information derived from sensor data (such as the user's current geographic location, nearby establishments, motion information, etc.). The context data 124 may alternatively or in addition include information that indicates an aspect of the user's personal situation, such as personal preferences, demographic information, topics of interest, and/or others). As described in more detail below, the user corpus 126 includes or defines a subset of the user content 122 that is used by the connection recommendation system 136, 174 to generate connection recommendations. The lexical space 128 is embodied as a computer programming construct (e.g. a multi-dimensional vector or array) that represents semantic and/or lexical information about the corpus 126 as it relates to a body of user corpora 164, where the user corpora 164 contains the corpus 126 and a similar corpus for each of the other computing device users in the set of computing device users participating in the connection recommendation system 136, 174. Accordingly, in order to create the lexical space 128, the computing system 100 determines the set of computing device users for whom user content 122 should be analyzed and a corpus 126 created. The illustrative lexical space 128 is defined as a multidimensional space that has a number of dimensions (or positions), where the number of dimensions corresponds to the number of lexical items in the user corpora 164, and each of the dimensions represent one of the lexical items existing in the corpora 164. For example, if the corpora 164 includes a document 1, "Dandelions are flowers," authored by user 1 and a document 2 authored by a user 2, "Dandelions are weeds," the vector representation of the corpora 164 may be: [dandelions, are, flowers, weeds]; the vector representation of document 1 may be: [1, 1, 1, 0]; and the vector representation of document 2 may be [1, 1, 0, 1]. The semantic distance between the document 1 and document 2 vectors can be computed mathematically and used by the computing system 100 as an indication of the semantic similarity of the content generated by the two users.

The user profile 130 includes information about the computing device user that the connection recommendation system 136, 174 uses to make connection recommendations. For instance, the user profile 130 may include the context data 124, the corpus 126 or a reference thereto, and/or any other information that may be useful to, for example, filter out unwanted or irrelevant connection recommendations.

The illustrative client computing device 110 also includes one or more sensors 132, a user interface subsystem 134, the "local portion" of the connection recommendation system 136, and a communication subsystem 138. The client computing device 110 may include other or additional components, such as those commonly found in mobile and/or stationary computers (e.g., various sensors and input/output devices), or lack one or more of the illustrated components (e.g., the sensors 132), in other embodiments. Additionally, in some embodiments, one or more of the illustrative components may be incorporated in, or otherwise form a portion of, another component of the computing device 110. Portions of the connection recommendation system 136 may be incorporated into another application or system (e.g., the user-level application 118). For instance, the connection recommendation system 136 may be embodied as a widget or plug-in to a search engine or social media application, and may analyze content, context data, and social network data "in the background" as the user engages with the application or system or in response to the user creating content.

The processor 112 may be embodied as any type of processor capable of performing the functions described herein. For example, the processor 112 may be embodied as a single or multi-core processor(s), digital signal processor, microcontroller, or other processor or processing/controlling circuit. The memory 114 may be embodied as any type of volatile or non-volatile memory or data store capable of performing the functions described herein. In operation, the memory 114 may store various data and software used during operation of the client computing device 110, such as operating systems, applications, programs, libraries, and drivers. For example, the memory 114 may at least temporarily store portions of the user content 122, the context data 124, the user corpus 126, the lexical space 128, and/or the user profile 130. Each of the user content 122, the context data 124, the user corpus 126, the lexical space 128, and the user profile 130 may be embodied in an electronic file, table, database, or other suitable computerized data structure (e.g., a vector, array, or tree), according to the requirements of a particular design or implementation of the system 136, 174.

The memory 114 is communicatively coupled to the processor 112, e.g., via the I/O subsystem 116. The I/O subsystem 116 may be embodied as circuitry and/or components to facilitate input/output operations with the processor 112, the memory 114, and other components of the client computing device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and/or other components of the client computing device 110, on a single integrated circuit chip.

The user-level application 118 may be embodied as any type of computer application (e.g., software, hardware, firmware, or a combination thereof) that is configured to interface with an end user through a human interface device, such as a keyboard, mouse, microphone or touchscreen. For example, the user-level application 118 may be embodied as a "front end" to a search engine, a social media service, an electronic messaging service, or another type of computer application or suite of computer applications that can run on the client computing device 110. For instance, the user-level application 118 may include a web-based social media service, with which the connection recommendation system 136, 174 communicates (e.g., as a submodule or as an external service accessed by the social media service, e.g., through an API). The data storage device 120 may be embodied as any type of device or devices configured for short-term or long-term storage of data such as, for example, memory devices and circuits, memory cards, hard disk drives, solid-state drives, or other data storage devices. The data storage device 120 may include a system partition that stores data and firmware code for the client computing device 110. The data storage device 120 may also include an operating system partition that stores data files and executables for system components (e.g., an operating system) of the client computing device 110.

The sensor(s) 132 (if present) may be embodied to include a motion sensor device (e.g., an accelerometer, inclinometer, kinetic sensor or proximity sensor), an orientation sensor (e.g., a gyroscope), a mobile pointing device (e.g., an infrared device), a location sensor (e.g., Global Positioning System or GPS), a still or video camera, an eye-tracking device, or another type of sensing device or combination of sensing devices. The sensor(s) 132 may be configured to detect, capture, and process various information about the environment in which the user is currently operating the client computing device 110 and/or the user's interactions with the client computing device 110. All or portions of such information may be stored by the client computing device 110 for use by the connection recommendation system 136, 174, e.g., as the context data 124.

The user interface subsystem 136 may include a number of devices to facilitate user interaction with the client computing device 110, or with the connection recommendation system 136, in embodiments in which the end user interacts directly with the connection recommendation system 136. Of course, in some embodiments, the connection recommendation system 136 may not interface directly with end users. This may be the case where, for example, the connection recommendation system 136 is accessed by or incorporated into an existing system (e.g., a social media application). In any event, the user interface devices of the user interface subsystem 136 may include physical and/or virtual control buttons or keys, a microphone, a speaker, a unidirectional or bidirectional still and/or video camera, and/or others. Any of the sensor(s) 132 and/or portions of the user interface subsystem 136 may be integrated with the client computing device 110 (e.g., as a "built-in" component thereof) or in communication with the client computing device 110 (e.g., by the network(s) 180 or a Universal Serial Bus connection).

The "local portion" of the connection recommendation system 136 may be embodied as any type of computer application (e.g., hardware, software or a combination thereof) that is capable of performing the functions described herein. For example, the connection recommendation subsystem 136 may be embodied to include a portion of the modules shown in FIG. 2 and described below that receive and process the user profile 130, user content 122, context data 124, user identifiers (e.g., user names), and/or other user data. In some embodiments, the connection recommendation system 136 may include portions of the corpus development module 210, the social network identifier module 228, the user profile generator 214 and/or the context extraction module 218, which are described in more detail below. Alternatively or in addition, the connection recommendation system 136 may include functionality that monitors the creation of user content by, for example, interfacing with the user-level application 118 or implementing a screen-scraping or web-scraping technique. In this way, the connection recommendation system 136, 174 can be responsive to new user content as it is generated, or the connection recommendation system 136, 174 can collect samples of user content over time for offline analysis. For instance, the connection recommendation system 136, 174 may generate and present a connection recommendation as disclosed herein directly in response to a user's most recent social media posts, blog posts, instant messages, tweets (e.g., in "real time"), or a combination thereof. Alternatively or in addition, the connection recommendation system 136, 174 may aggregate these and/or other samples of user content over time (e.g., using a model), and then analyze the user content collectively to generate connection recommendations as disclosed herein. It should be noted that in some embodiments, the connection recommendation system 136, 174 can access and utilize user content that is generated across a variety of different applications (e.g., messaging, social media, and email). In other words, the connection recommendation system 136, 174 is not limited to use in connection with content that is created within a single software application.

The communication subsystem 138 may be embodied as any type of communication circuitry, device, or collection thereof, capable of enabling electronic communications between the client computing device 110 and other electronic devices, including the server computing device 150. The communication subsystem 138 may be configured to use any one or more communication technologies (e.g., optical, wireless or wired communications) and associated protocols (e.g., Ethernet, BLUETOOTH, WI-FI, WiMAX, 3G/LTE, etc.) to effect such communication. The communication subsystem 138 may be embodied as one or more network adapters, including a wireless network adapter.

The server computing device 150 may be embodied as any type of device for performing the functions described herein. For example, the server computing device 150 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the illustrative server computing device 150 includes a processor 152, memory 154, an input/output subsystem 156, and a data storage device 158, which has embodied therein: user content 160, context data 162, the user corpora 164, a lexical space 166, and user profiles 168. The user content 122 includes user content 122 that is created by one or more of the computing device users in the set of computing device users participating in the connection recommendation system 136, 174. For example, the user content 160 may be embodied as an aggregation of all of the user content 122 for all of the participating computing device users, and thereby facilitate a determination by the system 136, 174 as to whether any of the computing device users have any user content 122 in common. The context data 162 includes context data 124 for one or more of the computing device users in the set of computing device users participating in the connection recommendation system 136, 174. For example, the context data 162 may be embodied as an aggregation of all of the context data 124 for all of the participating computing device users, and thereby facilitate a determination by the system 136, 174 as to whether any of the computing device users have context data 124 in common.

The user corpora 164 includes, references, or defines each user corpus 126; e.g., the user corpus 126 of each of the computing device users participating in the system 136, 174 is included, referenced, or defined in the corpora 164. The lexical space 166 is embodied as a computer programming construct (e.g. a multi-dimensional vector) that represents semantic and/or lexical information about the each of the individual corpora 126 as it relates to the entire body of user corpora 164. For example, the lexical space 166 may be embodied as an aggregation of each of the individual lexical spaces 128 of each of the participating computing device users, and may thereby facilitate the clustering performed by the computing system 100, described below. The user profiles 168 include the user profiles 130 of one or more of the computing device users participating in the connection recommendation system 136, 174. For instance, the user profiles 168 may be embodied as an aggregation of all of the user profiles 130 of all of the participating computing device users, and may thereby facilitate a determination by the computing system 100 as to whether to make a connection recommendation for a particular pair of computing device users. In general, the server portion of the connection recommendation system 174 may access any or all of the data mentioned herein, as needed to perform the functions described herein (e.g. the user content 122, 160, the context data 124, 162, the user corpora 126, 164; the lexical space 128, 166, the user profiles 130, 168, and/or others). Any or all of the data mentioned herein, or otherwise needed to perform the functions described herein (e.g. the user content 122, 160, the context data 124, 162, the user corpora 126, 164; the lexical space 128, 166, the user profiles 130, 168, and/or others) may be embodied in software, firmware, hardware, or a combination thereof.

The server computing device 150 also includes a user interface subsystem 170, a social network service 172, the "remote portion" of the connection recommendation system 174, and a communication subsystem 176. The social network service 172 may be embodied as any computerized service or combination of services that can provide social network data for a user (e.g., software, firmware, hardware, or a combination thereof). As used herein, "social network data" may refer to, among other things, data that identifies one or more computing device users and the dyadic connections between the users. The social network service 172 may include social media sites, the user's electronic contacts system, email services, electronic messaging services, blogging services, calendar services, address books, relationship management systems (e.g., customer relationship management or CRM systems) and/or other electronic services or applications in which user and connection information may be contained.

The "remote portion" of the connection recommendation system 174 may be embodied as any type of computer application (e.g., hardware, software or a combination thereof) that is capable of performing the functions described herein. For example, the connection recommendation system 174 may be embodied to include portions of the connection generator module 220 shown in FIG. 2 and described below. Alternatively or in addition, the connection recommendation system 174 may include functionality to maintain, or to monitor the creating and updating, of the user content 122, 160, the context data 124, 162, the user corpora 126, 164; the lexical space 128, 166, the user profiles 130, 168 by the computing system 100 and/or various users of the computing system 100. For instance, the connection recommendation system 174 may execute the connection generator module 220 automatically in response to detecting an update to a user profile 130, 168 or user content 122, 160 made by the computing system 100 or one of the users of the computing system 100.

Of course, the server computing device 150 may include other or additional components, such as those commonly found in mobile and/or stationary computers (e.g., various sensors and input/output devices), in other embodiments. Additionally, in some embodiments, one or more of the illustrative components may be incorporated in, or otherwise form a portion of, another component. For example, the connection recommendation system 174, or portions thereof, may be incorporated in the social network service 172, in some embodiments. The foregoing description of elements of the client computing device 110 applies to elements of the server computing device 150 that have the same or similar name (e.g., processor 112 and processor 152, etc.). Thus, for brevity, the description is not repeated here. Additionally, it should be understood that separate instances of data such as user profiles 130, 168 and user content 122, 160 are shown as residing on the client computing device 110 and the server computing device 150, respectively, in order to illustrate that portions of such data and/or content belonging to the same user or different users may reside on multiple computing devices (e.g., in a distributed computing environment).

The network(s) 180 may be embodied as a cellular network, a local area network, wide area network (e.g., WI-FI), personal cloud, virtual personal network (e.g., VPN), enterprise cloud, public cloud, Ethernet, public network such as the Internet, or a combination thereof. Alternatively or in addition, the network(s) 180 may enable shorter-range wireless communications between the server computing device 150 and the client computing device 110, using, for example, BLUETOOTH and/or Near Field Communication (NFC) technology. It will be appreciated that the teachings herein, e.g., the connection recommendation system 136, 174, may be adapted or adjusted as needed to efficiently operate with respect to the underlying network technology used for the network(s) 180. Further, it will be understood that other technologies or protocols (e.g., TCP/IP and/or others) may be implemented over the network(s) 180 without alteration.

Figure 2:
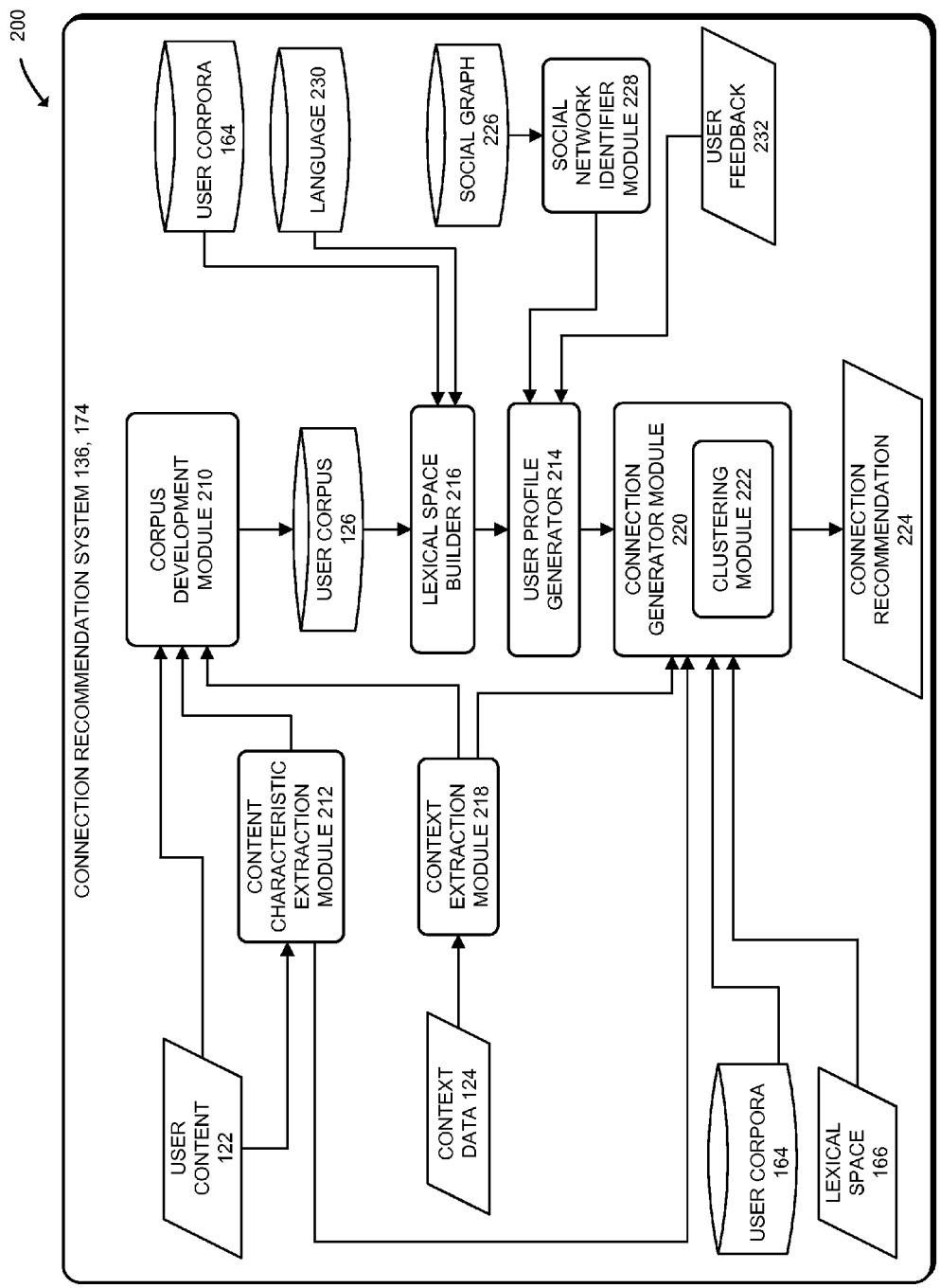
FIG. 2 is a simplified block diagram of at least one embodiment of an environment of the computing system of FIG. 1.

Referring now to FIG. 2, in some embodiments, the computing system 100 establishes an environment 200 during operation. At any given time, the illustrative environment 200 may include active (e.g., loaded and/or executing) components on one or both of the server computing device 150 and the client computing device 110. In the illustrative embodiment, these components are embodied as a number of modules, including a corpus development module 210, a content characteristic extraction module 212, a user profile generator 214, a lexical space builder 216, a context extraction module 218, connection generator module 220, a clustering module 222, and a social network identifier module 228. Each of the corpus development module 210, the content characteristic extraction module 212, the user profile generator 214, the lexical space builder 216, the context extraction module 218, the connection generator module 220, the clustering module 222, the social network identifier module 228, and/or any other modules for performing the functions disclosed herein may be implemented in software, firmware, hardware, or a combination thereof.

In operation, a corpus development module 210 creates the corpus 126 for each of the participating computing device users. To do this, the corpus development module 210 selects user content 122 for inclusion in the corpus 126 and indexes and stores the selected user content 122 in the corpus 126 so that the selected user content 122 is searchable (e.g., via meta data or keyword queries). In selecting the user content 122 for inclusion in the corpus 126, a content characteristic extraction module 212 and/or a context extraction module 218 may be employed to supply content characteristic information and/or context data 124, which may be used by the corpus development module 210 to filter the user content 122 prior to inclusion in the corpus 126. For example, the content characteristic extraction module 212 may perform information extraction techniques on the user content 122 to derive therefrom one or more high-level topics or writerly qualities, which may be used to selectively define the corpus 126. To do this, the content characteristic extraction module 212 may perform a topic extraction method or a stylometric analysis, for example. In this way, the corpus 126 may be limited to a particular topic or subject matter (e.g., a "domain") or a particular type of content (e.g., scholarly articles or informal conversational messages). Similarly, the context extraction module 218 may supply context data 124 to the corpus development module 210, which may be used by the corpus development module 210 to limit the corpus 126 to user content 122 that relates to particular context data 124. Context data 124 may include, for example, data/time information, user location data, wireless access point, network type information, or other information that may be used to determine the user's current geographic location or current context. For instance, the corpus development module 210 may develop the corpus 126 to include only user content 122 created during a certain time period or while the user is physically present at a particular geographic location (e.g., all tweets sent while the user is at a conference).

A lexical space builder 216 builds the lexical space 128, 166 by, for each computing device user participating in the system 136, 174, algorithmically performing lexical and/or semantic content analysis on the corpus 126. This process may be referred to as determining the extent of the corpus in the lexical space 128, 166. The content analysis may include, for example, extracting low polysemy lexical items from the corpus 126. To do this, the illustrative lexical space builder 216 applies a mathematical technique, such as a modified inverse document frequency technique, to deprioritize or remove from consideration high polysemy lexical items. To determine whether a lexical item is "high polysemy," the lexical space builder 216 interfaces with a language model 230 to obtain information about the lexical item's language frequency (e.g., the frequency of occurrence of the lexical item in the language model 230). The lexical space builder 216 creates a mathematical model (e.g., a "bag of words" model) from the set of lexical items that remains after the words having a high language frequency are omitted. The lexical space builder 216 may augment the mathematical model with one or more terms of interest using, for example, a pick list. The language model 230 may be embodied as, for example, a database, lookup table or computer file that contains a list of words used in a language (e.g., American English) and data indicating the frequency of occurrence of each word in the usage of the language. An example of a language model that is available as an open source resource is WORDNET. As used herein, "bag of words" may refer to, among other things, a type of mathematical model that represents a document as a vector, with each position in the vector representing the number of occurrences of a lexical item (e.g., a word) in the document.

Once the low polysemy lexical items have been extracted from the corpus 126, the lexical space builder 216 may further refine the extracted set of lexical items to focus on "uncommon" words or terms, e.g., words that may indicate a particular interest or area of expertise of the computing device user. To do this, the lexical space builder 216 analyzes the corpus frequency and the language frequency of the extracted lexical items (e.g., words or terms) and selects a subset of the extracted lexical items based on the corpus frequency and language frequency. More particularly, the lexical space builder 216 may include in the subset of extracted lexical items only those words or terms that have both a low corpus frequency and a low language frequency (where corpus frequency may refer to the frequency of occurrence of the word or term in the corpus 126 and the language frequency may refer to the frequency of occurrence in the language model 230). The corpus frequency and language frequency may be determined from the bag of words model, in some embodiments. In this way, the subset of extracted lexical items that is used to find connection recommendations may only include low polysemy lexical items found in the user's corpus 126 that have both a low corpus frequency and a low language frequency. The particular combination of analyses described above may be referred to as a "modified document frequency."

As part of the content analysis or as a separate process, the illustrative content characteristic extraction module 212 extracts one or more topics from the user content 122, 160, or the lexical space builder 216 performs topic extraction on the corpus 126, using an algorithmic topic extraction technique. As used herein, a "topic" may refer to, among other things, a word or other lexical item that is contained in the user content 122, 160 and which is determined to be of interest (e.g., based on language frequency or corpus frequency). A topic may also refer to another lexical item that describes one or more of the lexical items that actually occur in the user content 122, 160 but which does not itself actually occur in the user content 122, 160. For example, a topic may be a lexical item that does not occur in the user content 122, 160 but represents the meaning of one or more lexical items that are contained in the user content 122, 160, albeit at a more concrete or a more abstract level. As such, a topic may comprise a category, a type, or a label that is derived from the actual user content 122, 160, in some embodiments.

A social network identifier module 228 identifies a social graph 226 to be used by the connection recommendation system 136, 174 to obtain social network data for each of the computing device users participating in the system 136, 174. For example, if the connection recommendation system 136, 174 interfaces with one or more external services to obtain social network data, the social network identifier module 228 may create and maintain a list of all of the social network services 172 to which the user belongs and/or a list of the email services that the user uses. The social network identifier module 228 may request such information from the user directly (e.g., via the user interface subsystem 134) and/or may obtain such information through the use of automated techniques (e.g., via an application programming interface or API that is exposed by a software service provider). On the other hand, if the connection recommendation system 136, 174 is incorporated as part of a social network service 172, the social network identifier module 228 may provide portions of the social graph 226 for use by the system 136, 174 or provide a mechanism for accessing the social graph 226 (e.g., a function call).

A user profile generator 214 generates the user-specific profiles 130, 168 for each of the computing device users participating in the system 136, 174. The user profile generator 214 may also, from time to time, update the user profiles 130, 168 in response to user feedback 232, which may be received or obtained by the connection recommendation system 136, 174 via, for example, the user interface subsystem 134.

A connection generator module 220 generates connection recommendations 224 for the computing device users participating in the system 136, 174, from time to time, based on the user profiles 130, 168 and the subsets of extracted lexical items described above. More specifically, the connection recommendations 224 are derived at least in part from the content analysis performed by the lexical space builder 216, and the social graph 226, which may be obtained from the services identified by the social network identifier module 228. In some embodiments, the connection generator module 220 filters the connection recommendations 224 with context information obtained from the context extraction module 218 and/or content characteristic information obtained from the content characteristic extraction module 212. For example, the connection generator module 220 may prune the social graph 226 to only include people who are present at the same geographic location as the current user, or to include only people whose user content 122 evidences the same type of stylometric qualities as the current user's content.

A clustering module 222 algorithmically performs content clustering on the subsets of extracted lexical items of the computing device users participating in the system 136, 174. To do this, the illustrative clustering module 222 computes a measure of content similarity (e.g., lexical and/or semantic similarity) between the subsets of extracted lexical items, and clusters the subsets of extracted lexical items based on the computed semantic similarity. The subsets of extracted lexical items for all of the participating users may be obtained from, for example, the lexical space 166 and/or the corpora 164. As an example, two or more subsets of extracted lexical items may cluster together if the lexical and/or semantic distance between the subsets of extracted lexical items is short. Conversely, if the lexical and/or semantic distance between two subsets of extracted lexical items is long, the subsets may not cluster together. As used herein, "clustering" may refer to, among other things, the execution of a mathematical algorithm to group the subsets of extracted lexical items together based on semantic and/or lexical similarity. To compute the lexical and/or semantic distances between the subsets of extracted lexical items, ontologies, graphs, and/or statistical methods may be used. For instance, with a hierarchical ontology, lexical and/or semantic distance can be computed by determining the number of links between the nodes or "concepts" in the ontology (e.g., a greater number of links indicates a longer distance).

Based on the clustering performed by the clustering module 222, and other information provided by the user profiles 130, 168, the content characteristic extraction module 212 and/or the context extraction module 218 (if any), the connection generator module 220 identifies a set of connection candidates. The set of connection candidates may include, for example, pairs or groups of computing device users whose sets of extracted lexical items have clustered together, as determined by the clustering module 222. The connection generator module 220 refers to the social graph 226 to determine whether any of the connection candidates are relationally close (as indicated by the social graph 226). The connection generator module 220 "prunes" the set of connection candidates using the social graph 226, in order to remove individuals from the set of connection candidates who are relationally close to the user according to the social graph 226. Once the set of connection candidates has been pruned to include only or primarily people who are relationally distant to one another or to the user, the connection generator module 220 generates the connection recommendation 224.

In pruning the social graph or generating the connection recommendation 224, the connection generator module 220 may consider the context data 124 provided by the context extraction module 218 for each user. For an individual user, the context extraction module 218, periodically or in response to a trigger action (e.g., a request from the connection generator module 220), obtains the context data 124 from the sensor(s) 132 and formats it for use by the connection generator module 220 (using, e.g., an analog-to-digital converter and/or signal processing techniques as needed). As noted above, the context data 124 may be aggregated across all users and stored as the context data 166. As such, the connection generator module 220 may use context as a filter, by comparing the context data 124 across multiple users (e.g., across all connection candidates) and creating a subset of the connection candidates including only those connection candidates that have similar context data 124. In this way, the connection recommendation 224 may be generated differently depending on the current context of the computing device users. In other words, the connection recommendation 224 can be fluid, continuously evolving based on changes in the context data 124. As an example, the connection generator module 220 may utilize a different social graph 226 or prune the set of connection candidates differently, depending on whether the user and/or one or more of the connection candidates is detected by the context extraction module 218 as being at an information science conference or at a child's football game.

The connection recommendation 224 may include information identifying pairs, groups, or combinations of computing device users participating in the system 136, 174 (by, e.g., the person's name or user name) as well as a means by which a user or the computing system 100 can execute the connection recommendation 224 (by, e.g., a user-selectable graphical control button). If the connection recommendation 224 includes more than one recommended user, the list of recommended users may be ordered or ranked based on, for example, relational distance or semantic distance. For instance, a greater degree of relational distance or a higher degree of semantic similarity may increase a recommended connection's ranking in the list and vice versa. Although the connection recommendation system 136, 174 is primarily directed to suggesting connections based on on a semantic analysis of user-generated content 122, 160, in other embodiments, the connection recommendation system 136, 174 analyzes the nature and/or writerly qualities of the user's typing activity, and such analysis is used to generate connection recommendations 224.

Figure 3:
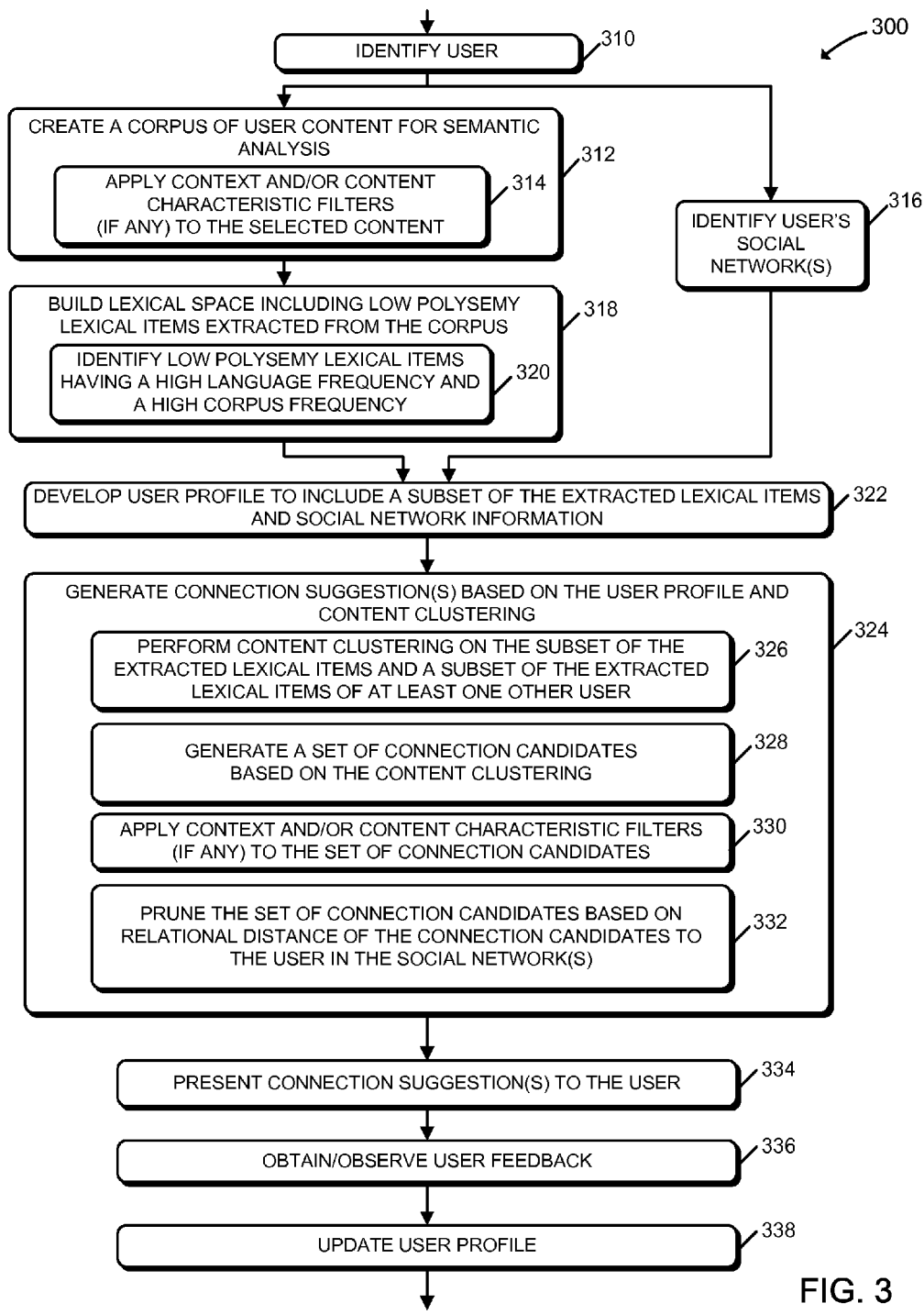
FIG. 3 is a simplified flow diagram of at least one embodiment of a method for generating a connection recommendation with the computing system of FIG. 1.

Referring now to FIG. 3, an example of a method 300 for generating a connection recommendation 224 is shown. Portions of the method 300 may be executed by the computing system 100; for example, by the client computing device 110 and/or the server computing device 150. At block 310, the computing system 100 identifies a computing device user of a set of computing device users for whom a connection recommendation 224 is to be generated. To do this, the computing system 100 obtains user identifying information, such as a user name, device identifier (e.g., an International Mobile Equipment Identity or IMEI), or network address (e.g., a media access control or MAC address, an Internet Protocol or IP address, etc.). The user identifying information may be obtained by the computing system 100, for example, at user login. The set of computing device users may be defined by the computing system 100 by, for example, referring to a list of computing device users who are participating in the system 136, 174. A computing device user may be "participating" in the system 136, 174 as a result of having registered with the system 136, 174 as an authorized user, by virtue of the user's previous registration with a cooperating online service (such as a social network service 172), or by other methods. For example, in some embodiments, computing device users may expressly "opt in" to the system 136, 174 while in other embodiments, computing device users may participate in the system 136, 174 as a result of their use of another service (and may be afforded an opportunity to "opt out" of the system 136, 174).

At block 312, the computing system 100 selects user content 122, 160 to be analyzed for the purpose of generating a connection recommendation. The user content 122, 160 may include structured and/or unstructured content. At block 314, the computing system 100 may apply context and/or content characteristic filters to the selected content. For instance, to select the user content or filter the selected content, the computing system 100 may use temporal criteria (e.g., the most recently generated content); content type criteria (e.g., documents but not blog posts; emails but not text messages, etc.); application type criteria (e.g., social media but not messaging or photo sharing), subject matter criteria (e.g., only Product X), or any other suitable criteria for defining the scope of the user content to be analyzed. The computing system 100 may determine the applicable selection and/or filtering criteria as a result of user input (by, e.g., the user interface subsystem 134), or by pre-configuring the connection recommendation system 136, 174, for instance. Alternatively or in addition, the context data 124, 162 may be used to select or filter the user content to be analyzed. The selected (and filtered, as applicable) user content 122, 160 is stored in or referenced by the user corpus 126.

In some languages, the number of meanings associated with a word (polysemy) and the frequency of occurrence of the words in the language (language frequency) are highly correlated. That is, it may be statistically more likely that a frequently used word will have many meanings. For example, the word "horse" has over 10 word senses in the Collins dictionary (which is meant to be a simple dictionary), including: the animal, the gymnastics equipment, the chess piece, mounted troops, and others. Horse is also a relatively frequent word in the English language. Accordingly, embodiments of the computing system 100 sense-distinguish the words or collocated words by focusing the document analysis on the lower frequency words. For example, the computing system 100 may assign higher weights to words having a lower language frequency.

In some cases, a word may only occur once in the corpus 126. This is known as "hapax legomena." These words, while infrequent, may not indicate a strong presence of a particular concept in the user's content 122, 160. For example, about 44% of the words in the novel *Moby Dick* (one of the longest novels in the English language, with over 200,000 distinct words) are hapax legomenon, and another 17% of the words occur only twice. To accommodate hapax legomena, embodiments of the computing system 100 may focus the document analysis on lower frequency words in the language (by, e.g., selecting a subset of words based at least in part on the rarity of the words and increasing the weights of the rarer words). The output of blocks 318, 320 is a subset of the lexical items (e.g., words) that have been extracted from the user's corpus 126, and includes one or more low polysemy, low language frequency, low corpus frequency lexical items.

At blocks 318, 320, the computing system 100 builds the lexical space 128, 166 based at least in part on the user corpus 126 created at block 312, using document analysis techniques. For example, the computing system 100 extracts text from the corpus, discards frequently used words (e.g., high polysemy words), and assigns higher weight values to infrequently used words (e.g., low polysemy words). Rare (low polysemy) words that are frequently occurring in the corpus 126 may be used by the computing system 100 to identify topics of interest. At block 320, the computing system 100 algorithmically identifies a subset of the extracted low polysemy words having a low language frequency and a low corpus frequency. To identify or create the subset, the computing system 100 may, for example, adjust (e.g., increase) weight values of the extracted lexical items that have a low language frequency.

At block 316, the computing system 100 identifies the social network data to be used to filter the set of connection candidates created by the system 136, 174. The functionality depicted as block 316 may be performed by the computing system 100 concurrently with the functionality of block 312 and/or block 318, in some embodiments. To do this, the computing system 100 may access the user's social graph 226 directly (e.g., in embodiments in which the connection recommendation system 136, 174 is incorporated into an existing social network service), or the computing system 100 may access the information about potential connections (e.g., a contacts list or a social graph maintained in a computer file or by an external social media service) through, e.g., an application programming interface (API). At block 322, the computing system 100 creates a user profile for the user, which identifies the subset of lexical items that are derived from the user content at blocks 318, 320, and also includes the social network information obtained at block 316. In some embodiments, the user profile may include other information, such as structured information supplied by the user (e.g., personal preferences, demographic information, etc.), context data 124, and/or content characteristic information extracted from the user content by the content characteristic extraction module 212.

At block 324, the computing system 100 generates one or more connection recommendations using the techniques disclosed herein. At block 326, one or more content clustering algorithms are executed to find content that has been developed or accessed by, e.g., other computing device users on the network and that is semantically similar to the user's own content in the ways that are directed by the "modified document frequency" approach described herein. In other words, the computing system 100 focuses the content clustering on the low polysemy words identified in blocks 318, 320. To do this, the illustrative computing system 100 applies one or more clustering algorithms to compute semantic distances between the subset of lexical items created for the user at blocks 318, 320 and the subsets of lexical items similarly created for other computing device users participating in the system 136, 174. Some examples of clustering algorithms and techniques are CLIQUE, SUBCLU, OSCLU and latent Dirichlet allocation.

At block 328, the computing system 100 generates a set of connection candidates based on the content clustering performed at block 326. The set of connection candidates is generated based on the length of the semantic distances that are computed at block 326. For example, if the semantic distance between two users' respective subsets of extracted lexical items is short, the computing system may add the pair of users to the set of connection candidates, as a connection candidate for either or both of the users in the pair. The computing system 100 identifies the users that are associated with the clustered content by, for example, obtaining the user identifiers that are associated with the clustered content (e.g., author names on documents, message sender identifiers, etc.). The user-identifying information may be contained in, for instance, meta-tags that are associated with or appended to the clustered content. At block 330, the computing system 100 may perform context or content characteristic filtering to the set of connection candidates. For instance, the computing system 100 may remove from the set of connection candidates any connection candidates whose context data does not match the user's current context, or add to the set of connection candidates users whose context data matches the user's current context. To do this, the computing system 100 may poll one or more of the sensors 132. If sensor data is available, the computing system 100 extracts the context data 124 from the sensor data. For instance, the computing system 100 may obtain location coordinates or other indicators of geographic information from the sensor data, and determine a likely current location of the user by, for example, interfacing with geographic mapping software. Geographic location data and other context data 124 may be exposed by another software application running on the client computing device 110, in some embodiments. As used herein, "context data" may include, among other things, sensed information or information derived from sensor data (such as geographic location, proximity, etc.), as well as the textual clustering of output.

At block 332, the computing device removes from the set of connection candidates those connection candidates who are determined to be relationally close to the user in the social graph 226. In other words, the computing system 100 can use the social graph 226 obtained at block 316 to trim out connection candidates who are already within the user's social sphere. To do this, the computing system 100 can weight links between people based on their relational distance in the social graph 226, such that if people are relationally close (e.g., within one or two degrees), the weight assigned to the link will be lower. If people are relationally distant in the social graph 226, a higher weight can be assigned to the link. At the end of the analysis, the computing system 100 removes those candidates that have low-weighted links from the list of connection candidates, and only those candidates that are more relationally distant from the user are considered for the connection recommendation. In these and other ways, the computing system 100 combines semantic clustering tools with the social graph 226 to disrupt the tendency toward balkanization (e.g., a social network's inclination to keep an individual's world small by effectively enabling connections that already exist).

In some embodiments, rather than interpreting social connections in a binary manner (e.g., as indicating either a "strong" tie or a "weak" tie), the computing system 100 uses connection strength as a "continuous" variable such that at any given point in time, with any single person, a relationship with another person can be a potentially unknowable and constantly shifting combination of closeness and distance. In other words, the weight assigned by the computing system 100 to any given link between the user and a connection candidate can be variable, e.g., adjusted over time, based on, for example, the context data 124.

The computing system 100 presents the connection recommendation to the user (via, e.g., the user interface subsystem 134) at block 334 and obtains or observes (e.g., via a touchscreen or camera of the client computing device 110) user feedback 232 in response to the presentation of the connection recommendation, at block 336. For example, the computing system 100 may capture implicit or explicit user feedback as to whether the connection suggestion is useful or appreciated. At block 338, the computing system 100 may update the user profile to, for example, include information obtained from the user feedback at block 336. For instance, the computing system 100 may modify the subset of extracted lexical items or prune the social graph differently in response to user feedback.

The computing system 100 is designed to help users find relationships based on commonalities that that the user may not know to look for, such as a mutual propensity for discussing a particular topic or having a particular writing style in common. As an example, suppose that the employees of a large company want to facilitate their work by finding other employees who have faced a similar issue. If one of the employees has prior experience selling educational technology through a supplier to a ministry of education of a foreign country, this information could be useful even though it is difficult to explicitly capture in a structured way (e.g., on an "expertise list") that would make it easy for someone else to discover. Additionally, there may be no word or phrase (e.g., a keyword) that can adequately convey the type of expertise in a concise, easily searchable form. In these and other circumstances, the computing system 100 can enable a person with expertise to connect with other people who are seeking the same type of expertise, while avoiding the time-consuming task of explicitly defining their areas of expertise and needs to the system in a structured way.

EXAMPLES

Illustrative examples of the technologies disclosed herein are provided below. An embodiment of the technologies may include any one or more, and any combination of, the examples described below.

Example 1 includes a computing device for generating a connection recommendation, the computing device including, for a computing device user in a set of computing device users: a corpus development module to include user-generated electronic content in a corpus; a lexical space builder module to select, from the corpus, low polysemy lexical items having a low corpus frequency and a low language frequency; a clustering module to perform content clustering on the selected subset and subsets of extracted lexical items of other users in the set of users; and a connection generator module to (i) identify a set of connection candidates including one or more of the other users in the set of users based at least in part on the content clustering; (ii) remove, from the identified set of connection candidates, a connection candidate that has a short relational distance to the user; and (iii) present a connection recommendation identifying at least one of the connection candidates remaining in the set of connection candidates after the connection candidate having a short relational distance to the user is removed from the set of connection candidates.

Example 2 includes the subject matter of Example 1, wherein the connection generator module is to receive context data obtained by a sensor of the computing device and modify the connection recommendation based at least in part on the context data.

Example 3 includes the subject matter of Example 1 or Example 2, wherein the corpus development module is to receive context data including data obtained by a sensor of the computing device and select the user-generated electronic content for inclusion in the corpus based at least in part on the context data.

Example 4 includes the subject matter of Example 1 or Example 2, wherein the connection generator module is to modify the connection recommendation based at least in part on a characteristic of the content, and the characteristic of the content is algorithmically determined by one or more of a topic analysis and a stylometric analysis.

Example 5 includes the subject matter of Example 1 or Example 2, wherein the corpus development module is to select the user-generated electronic content based at least in part on a characteristic of the content, wherein the characteristic of the content is algorithmically determined by one or more of a topic analysis and a stylometric analysis.

Example 6 includes the subject matter of Example 1 or Example 2, wherein the lexical space builder module is to build a multidimensional space includes a number of dimensions corresponding to a number of words in all of the corpora of the computing device users, and each of the dimensions of the multidimensional space represents a lexical item existing in at least one of the corpora.

Example 7 includes the subject matter of Example 1 or Example 2, wherein the lexical space builder module is to assign weights to the extracted lexical items according to the language frequency of the extracted lexical items.

Example 8 includes the subject matter of Example 1 or 2, including a social network identifier module to, for each of the computing device users, identify a social network of the computing device user, wherein the connection generator module obtains data indicating the relational distances between the computing device user and the connection candidate from the identified social network.

Example 9 includes the subject matter of Example 8, including a user profile generator module to develop a user profile including data relating to the subset of extracted lexical items and the identified social network, wherein the connection generator module is to generate the connection recommendation based at least in part on the user profile.

Example 10 includes the subject matter of Example 1 or Example 2, wherein the user-generated electronic content includes natural language input.

Example 11 includes the subject matter of Example 1 or Example 2, wherein the clustering module is to compute numerical distances between the subsets of extracted lexical items of pairs of computing device users.

Example 12 includes the subject matter of Example 1 or Example 2, wherein the connection generator module is to generate the connection recommendation if the computed numerical distance between the subsets of extracted lexical items of a pair of computing device users is short.

Example 13 includes a method for generating a connection recommendation, the method including, for a computing device user in a set of computing device users: including user-generated electronic content in a corpus; selecting, from the corpus, low polysemy lexical items having a low corpus frequency and a low language frequency; performing content clustering on the selected subset and subsets of extracted lexical items of other users in the set of users; identifying a set of connection candidates including one or more of the other users in the set of users based at least in part on the content clustering; removing, from the identified set of connection candidates, a connection candidate that has a short relational distance to the user; and presenting a connection recommendation identifying at least one of the connection candidates remaining in the set of connection candidates after the connection candidate having a short relational distance to the user is removed from the set of connection candidates.

Example 14 includes the subject matter of Example 13, and includes receiving context data obtained by a sensor of the computing device and modifying the connection recommendation based at least in part on the context data.

Example 15 includes the subject matter of Example 13, and includes receiving context data obtained by a sensor of the computing device and selecting the user-generated electronic content based at least in part on the context data.

Example 16 includes the subject matter of Example 13, and includes modifying the connection recommendation based at least in part on a characteristic of the content, wherein the characteristic of the content is algorithmically determined by one or more of a topic analysis and a stylometric analysis.

Example 17 includes the subject matter of Example 13, and includes selecting the user-generated electronic content based at least in part on a characteristic of the content, wherein the characteristic of the content is algorithmically determined by one or more of a topic analysis and a stylometric analysis.

Example 18 includes the subject matter of Example 13, and includes defining a multidimensional space to include a number of dimensions corresponding to a number of lexical items in all of the corpora of all of the computing device users in the set of computing device users, and defining each of the dimensions to represent a lexical item existing in at least one of the corpora.

Example 19 includes the subject matter of Example 13, and includes assigning weights to the extracted lexical items according to the language frequency of the extracted lexical items.

Example 20 includes the subject matter of Example 13, and includes identifying a social network of the computing device user and obtaining data indicating the relational distances between the computing device user and the connection candidate from the identified social network.

Example 21 includes the subject matter of Example 20, and includes developing a user profile including data relating to the subset of extracted lexical items and the identified social network, and generating the connection recommendation based at least in part on the user profile.

Example 22 includes the subject matter of Example 13, wherein the user-generated electronic content includes natural language input.

Example 23 includes the subject matter of Example 13, and includes computing numerical distances between the subsets of extracted lexical items of pairs of computing device users.

Example 24 includes the subject matter of Example 13, and includes generating the connection recommendation if the computed numerical distance between the subsets of extracted lexical items of a pair of computing device users is short.

Example 25 includes a computing device including memory having stored therein a plurality of instructions that when executed by the computing device cause the computing device to perform the method of any of Examples 13-24.

Example 26 includes one or more machine readable storage media including a plurality of instructions stored thereon that in response to being executed result in a computing device performing the method of any of Examples 13-24.

Example 27 includes a computing device including means for performing the method of any of Examples 13-24.

Example 28 includes a computing device for generating a connection recommendation, the computing device comprising, for a computing device user in a set of computing device users: means for including user-generated electronic content in a corpus; means for selecting, from the corpus, low polysemy lexical items having a low corpus frequency and a low language frequency; means for performing content clustering on the selected subset and subsets of extracted lexical items of other users in the set of users; means for identifying a set of connection candidates comprising one or more of the other users in the set of users based at least in part on the content clustering; means for removing, from the identified set of connection candidates, a connection candidate that has a short relational distance to the user; and means for presenting a connection recommendation identifying at least one of the connection candidates remaining in the set of connection candidates after the connection candidate having a short relational distance to the user is removed from the set of connection candidates.

Example 29 includes the subject matter of Example 28, and includes means for receiving context data obtained by a sensor of the computing device and means for modifying the connection recommendation based at least in part on the context data.

Example 30 includes the subject matter of Example 28, and includes means for receiving context data obtained by a sensor of the computing device and means for selecting the user-generated electronic content based at least in part on the context data.

Example 31 includes the subject matter of Example 28, and includes means for modifying the connection recommendation based at least in part on a characteristic of the content, wherein the characteristic of the content is algorithmically determined by one or more of a topic analysis and a stylometric analysis.

Example 32 includes the subject matter of Example 28, and includes means for selecting the user-generated electronic content based at least in part on a characteristic of the content, wherein the characteristic of the content is algorithmically determined by one or more of a topic analysis and a stylometric analysis.

Example 33 includes the subject matter of Example 28, and includes means for defining a multidimensional space to include a number of dimensions corresponding to a number of lexical items in all of the corpora of all of the computing device users in the set of computing device users, and means for defining each of the dimensions to represent a lexical item existing in at least one of the corpora.

Example 34 includes the subject matter of Example 28, and includes means for assigning weights to the extracted lexical items according to the language frequency of the extracted lexical items.

Example 35 includes the subject matter of Example 28, and includes means for identifying a social network of the computing device user and means for obtaining data indicating the relational distances between the computing device user and the connection candidate from the identified social network.

Example 36 includes the subject matter of Example 20, and includes means for developing a user profile including data relating to the subset of extracted lexical items and the identified social network and means for generating the connection recommendation based at least in part on the user profile.

Example 37 includes the subject matter of Example 28, wherein the user-generated electronic content includes natural language input.

Example 38 includes the subject matter of Example 28, and includes means for computing numerical distances between the subsets of extracted lexical items of pairs of computing device users.

Example 39 includes the subject matter of Example 28, and includes means for generating the connection recommendation if the computed numerical distance between the subsets of extracted lexical items of a pair of computing device users is short.

Example 40 includes one or more machine readable storage media comprising a plurality of instructions stored thereon that in response to being executed result in a computing device: including user-generated electronic content in a corpus; selecting, from the corpus, low polysemy lexical items having a low corpus frequency and a low language frequency; performing content clustering on the selected subset and subsets of extracted lexical items of other users in the set of users; identifying a set of connection candidates comprising one or more of the other users in the set of users based at least in part on the content clustering; removing, from the identified set of connection candidates, a connection candidate that has a short relational distance to the user; and presenting a connection recommendation identifying at least one of the connection candidates remaining in the set of connection candidates after the connection candidate having a short relational distance to the user is removed from the set of connection candidates.

Example 41 includes the subject matter of Example 40, wherein the instructions result in the computing device receiving context data obtained by a sensor of the computing device and modifying the connection recommendation based at least in part on the context data.

Example 42 includes the subject matter of Example 40, wherein the instructions result in the computing device receiving context data obtained by a sensor of the computing device and selecting the user-generated electronic content based at least in part on the context data.

Example 43 includes the subject matter of Example 40, wherein the instructions result in the computing device modifying the connection recommendation based at least in part on a characteristic of the content, wherein the characteristic of the content is algorithmically determined by one or more of a topic analysis and a stylometric analysis.

Example 44 includes the subject matter of Example 40, wherein the instructions result in the computing device selecting the user-generated electronic content based at least in part on a characteristic of the content, wherein the characteristic of the content is algorithmically determined by one or more of a topic analysis and a stylometric analysis.

Example 45 includes the subject matter of Example 40, wherein the instructions result in the computing device assigning weights to the extracted lexical items according to the language frequency of the extracted lexical items.

Example 46 includes the subject matter of Example 40, wherein the instructions result in the computing device identifying a social network of the computing device user and obtaining data indicating the relational distances between the computing device user and the connection candidate from the identified social network.

Example 47 includes the subject matter of Example 46, wherein the instructions result in the computing device developing a user profile comprising data relating to the subset of extracted lexical items and the identified social network, and generating the connection recommendation based at least in part on the user profile.

Example 48 includes the subject matter of Example 40, wherein the instructions result in the computing device computing numerical distances between the subsets of extracted lexical items of pairs of computing device users.

Example 49 includes the subject matter of Example 40, wherein the instructions result in the computing device generating the connection recommendation if the computed numerical distance between the subsets of extracted lexical items of a pair of computing device users is short.

The invention claimed is:

1. A computing device for generating a connection recommendation, the computing device comprising, for a computing device user in a set of computing device users:
   a corpus development module to include user-generated electronic content in a corpus;
   a lexical space builder module to select, from the corpus, a subset of low polysemy lexical items having a low corpus frequency and a low language frequency;
   a clustering module to perform content clustering on the selected subset and subsets of extracted lexical items of other users in the set of users; and
   a connection generator module to (i) identify a set of connection candidates comprising one or more of the other users in the set of users based at least in part on the content clustering; (ii) assign a weight to each connection candidate based on a relational distance between the corresponding connection candidate and the user; (iii) compare the weight of each connection candidate to a reference threshold; (iv) remove, from the identified set of connection candidates, those connection candidates that have an assigned weight less than the reference threshold; (v) present a connection recommendation identifying at least one of the connection candidates remaining in the set of connection candidates after those connection candidates having assigned weights less than the reference threshold are removed from the set of connection candidates, (vi) receive context data obtained by a sensor of the computing device, and (vii) modify the connection recommendation based at least in part on the context data, wherein the context data includes a current geographic location of the user.

2. The computing device of claim 1, wherein the corpus development module is to select the user-generated electronic content for inclusion in the corpus based at least in part on the context data.

3. The computing device of claim 1, wherein the connection generator module is to modify the connection recommendation based at least in part on a characteristic of the content, and the characteristic of the content is algorithmically determined by one or more of a topic analysis and a stylometric analysis.

4. The computing device of claim 1, wherein the corpus development module is to select the user-generated electronic content based at least in part on a characteristic of the content, wherein the characteristic of the content is algorithmically determined by one or more of a topic analysis and a stylometric analysis.

5. The computing device of claim 1, wherein the lexical space builder module is to build a multidimensional space comprises a number of dimensions corresponding to a number of words in all of the corpora of the computing device users, and each of the dimensions of the multidimensional space represents a lexical item existing in at least one of the corpora.

6. The computing device of claim 1, wherein the lexical space builder module is to assign weights to the extracted lexical items according to the language frequency of the extracted lexical items.

7. The computing device of claim 1, comprising a social network identifier module to, for each of the computing device users, identify a social network of the computing device user, wherein the connection generator module obtains data indicating the relational distances between the computing device user and the connection candidate from the identified social network.

8. The computing device of claim 7, comprising a user profile generator module to develop a user profile comprising data relating to the subset of extracted lexical items and the identified social network, wherein the connection generator module is to generate the connection recommendation based at least in part on the user profile.

9. The computing device of claim 1, wherein the user-generated electronic content comprises natural language input.

10. The computing device of claim 1, wherein the clustering module is to compute numerical distances between the subsets of extracted lexical items of pairs of computing device users.

11. The computing device of claim 10, wherein the connection generator module is to generate the connection recommendation if the computed numerical distance between the subsets of extracted lexical items of a pair of computing device users satisfies the reference threshold.

12. One or more non-transitory, machine readable storage media comprising a plurality of instructions stored thereon that in response to being executed result in a computing device:
including user-generated electronic content in a corpus;
selecting, from the corpus, a subset of low polysemy lexical items having a low corpus frequency and a low language frequency;
performing content clustering on the selected subset and subsets of extracted lexical items of other users in the set of users;
identifying a set of connection candidates comprising one or more of the other users in the set of users based at least in part on the content clustering;
assigning a weight to each connection candidate based on a relational distance between the corresponding connection candidate and the user;
comparing the weight of each connection candidate to a reference threshold;
removing, from the identified set of connection candidates, those connection candidates that have an assigned weight less than the reference threshold;
presenting a connection recommendation identifying at least one of the connection candidates remaining in the set of connection candidates after those connection candidates having assigned weights less than the reference threshold are removed from the set of connection candidates;
receiving context data obtained by a sensor of the computing device; and
modifying the connection recommendation based at least in part on the context data, wherein the context data includes a current geographic location of the user.

13. The one or more non-transitory, machine readable storage media of claim 12, wherein the instructions result in the computing device selecting the user-generated electronic content based at least in part on the context data.

14. The one or more non-transitory, machine readable storage media of claim 12, wherein the instructions result in the computing device modifying the connection recommendation based at least in part on a characteristic of the content, wherein the characteristic of the content is algorithmically determined by one or more of a topic analysis and a stylometric analysis.

15. The one or more non-transitory, machine readable storage media of claim 12, wherein the instructions result in the computing device selecting the user-generated electronic content based at least in part on a characteristic of the content, wherein the characteristic of the content is algorithmically determined by one or more of a topic analysis and a stylometric analysis.

16. The one or more non-transitory, machine readable storage media of claim 12, wherein the instructions result in the computing device assigning weights to the extracted lexical items according to the language frequency of the extracted lexical items.

17. The one or more non-transitory, machine readable storage media of claim 12, wherein the instructions result in the computing device identifying a social network of the computing device user and obtaining data indicating the relational distances between the computing device user and the connection candidate from the identified social network.

18. The one or more non-transitory, machine readable storage media of claim 12, wherein the instructions result in the computing device developing a user profile comprising data relating to the subset of extracted lexical items and the identified social network, and generating the connection recommendation based at least in part on the user profile.

19. The one or more non-transitory, machine readable storage media of claim 12, wherein the instructions result in the computing device computing numerical distances between the subsets of extracted lexical items of pairs of computing device users.

20. The one or more non-transitory, machine readable storage media of claim 19, wherein the instructions result in the computing device generating the connection recommendation if the computed numerical distance between the subsets of extracted lexical items of a pair of computing device users is satisfies the reference threshold.

21. A method for generating a connection recommendation, the method comprising, for a computing device user in a set of computing device users:
   including user-generated electronic content in a corpus;
   selecting, from the corpus, a subset of low polysemy lexical items having a low corpus frequency and a low language frequency;
   performing content clustering on the selected subset and subsets of extracted lexical items of other users in the set of users;
   identifying a set of connection candidates comprising one or more of the other users in the set of users based at least in part on the content clustering;
   assigning a weight to each connection candidate based on a relational distance between the corresponding connection candidate and the user;
   comparing the weight of each connection candidate to a reference threshold;
   removing, from the identified set of connection candidates, those connection candidates that have an assigned weight less than the reference threshold;
   presenting a connection recommendation identifying at least one of the connection candidates remaining in the set of connection candidates after those connection candidates having assigned weights less than the reference threshold are removed from the set of connection candidates;
   receiving context data obtained by a sensor of the computing device; and
   modifying the connection recommendation based at least in part on the context data, wherein the context data includes a current geographic location of the user.

22. The method of claim 21, comprising assigning weights to the extracted lexical items according to the language frequency of the extracted lexical items.

23. The method of claim 21, comprising computing numerical distances between the subsets of extracted lexical items of pairs of computing device users and generating the connection recommendation if the computed numerical distance between the subsets of extracted lexical items of a pair of computing device users satisfies the reference threshold.

* * * * *